United States Patent
Schur et al.

(10) Patent No.: US 9,355,020 B2
(45) Date of Patent: May 31, 2016

(54) RESOLVING NONDETERMINISM IN APPLICATION BEHAVIOR MODELS

(71) Applicants: Matthias Schur, Darmstadt (DE); Andreas Roth, Walzbachtal (DE)

(72) Inventors: Matthias Schur, Darmstadt (DE); Andreas Roth, Walzbachtal (DE)

(73) Assignee: SAP SE, Walldorf (DE)

( * ) Notice: Subject to any disclaimer, the term of this patent is extended or adjusted under 35 U.S.C. 154(b) by 2 days.

(21) Appl. No.: 14/337,345

(22) Filed: Jul. 22, 2014

(65) Prior Publication Data

US 2016/0026561 A1    Jan. 28, 2016

(51) Int. Cl.
*G06F 11/36*     (2006.01)

(52) U.S. Cl.
CPC .................. *G06F 11/3692* (2013.01)

(58) Field of Classification Search
CPC ............ G06F 11/3684; G06F 11/3688; G06F 11/263; G06F 11/3672
See application file for complete search history.

(56) References Cited

U.S. PATENT DOCUMENTS

| | | | |
|---|---|---|---|
| 8,448,143 B2 | 5/2013 | Wieczorek | |
| 2005/0240794 A1* | 10/2005 | Sinha | G06F 11/3684 714/1 |
| 2007/0050758 A1* | 3/2007 | Arevalo | G06F 17/5027 717/135 |
| 2008/0250273 A1* | 10/2008 | Yilmaz | G06F 11/3636 714/38.14 |
| 2014/0067836 A1 | 9/2012 | Holmes et al. | |
| 2013/0166966 A1* | 6/2013 | Keum | G06F 11/3672 714/48 |
| 2013/0239092 A1 | 9/2013 | Wieczorek et al. | |
| 2013/0338995 A1* | 12/2013 | Elkins | G06F 17/28 704/2 |
| 2013/0339930 A1* | 12/2013 | Xu | G06F 11/3684 717/125 |
| 2014/0173448 A1 | 6/2014 | Aly et al. | |

OTHER PUBLICATIONS

U.S. Appl. No. 13/908,244, filed Jun. 3, 2013, Schur et al.

* cited by examiner

*Primary Examiner* — Jigar Patel

(74) *Attorney, Agent, or Firm* — Fish & Richardson P.C.

(57) ABSTRACT

Methods, systems, and computer-readable storage media for resolving nondeterminism in a behavior model of a computing system under test (SUT). In some implementations, actions include: receiving a behavior model relating to a SUT, the behavior model including two or more nondeterministic transitions; obtaining trace data associated with execution of the SUT across the two or more nondeterministic transitions; determining based on the trace data, two or more transition guards that resolve nondeterminism of the two or more nondeterministic transitions; and associating the two or more transition guards with the two or more nondeterministic transitions to provide an extended behavior model.

17 Claims, 8 Drawing Sheets

510

| | Input Variables (attributes) | | | Target State |
|---|---|---|---|---|
| scores_boxselect info gain: 0.311 | subs_subaction 0 | scores_asubmit 0.311 | scores_subaction 1.0 | (class) |
| 1 | all submissions | Withdraw Submissions | Go | Reject | 05 |
| 2 | all submissions | Withdraw Submissions | Go | Accept | |
| 3 | default | Withdraw Submissions | default | default | |
| 4 | all submissions | Withdraw Submissions | Go | Pending | 02 |

RESOLVING NONDETERMINISM IN APPLICATION BEHAVIOR MODELS

BACKGROUND

System testing is an important part of quality assurance in software engineering. System tests are typically end-to-end tests, written by test engineers based on scenarios derived from the requirements and use cases of the system under test (SUT). From these scenarios, manual test cases can be created that are performed by human testers to ensure the functional correctness of the SUT.

Test automation aims to automate these manual test cases, so that the tests can be performed repeatedly and in a highly reliable manner on different versions of the SUT, e.g., regression testing. Creating automated system tests can be challenging, e.g., because the test engineers writing system tests have not developed the functionality and need to learn the SUT, and because automating test cases is time consuming and changes in the SUT can often require corresponding changes to some automated tests.

Model based testing (MBT) aims to increase the level of automation in test design by introducing formal behavior models that are used to algorithmically derive test cases. Using MBT, the number of test cases can be more easily adjusted based on an available time frame and targeted coverage goals. Creating and maintaining formal behavior models that are suitable for MBT can require deep knowledge of the SUT and the modeling language used for the behavior model, which can prevent the adoption of MBT in industrial software engineering.

SUMMARY

Implementations of the present disclosure include computer-implemented methods for resolving nondeterminism in application behavior models. In some implementations, actions include: receiving a behavior model relating to a SUT, the behavior model including two or more nondeterministic transitions; obtaining trace data associated with execution of the SUT across the two or more nondeterministic transitions; determining based on the trace data, two or more transition guards that resolve nondeterminism of the two or more nondeterministic transitions; and associating the two or more transition guards with the two or more nondeterministic transitions to provide an extended behavior model.

These and other implementations can each optionally include one or more of the following features: The method may further include: deriving, via a model-based test generator, a test suite based on the extended behavior model; and executing the test suite on the SUT. The SUT may be an enterprise web application, and executing the test suite may include automating a web browser. Determining the two or more transition guards may include: providing a training dataset based on the trace data; training a classifier based on the training dataset via a machine learning algorithm; and inferring the two or more transition guards based on output from the classifier. The training dataset may include a plurality of transition examples, each transition example including: a transition input vector including respective control values for a set of input variables; and a transition outcome including a target state in accordance with the control values of the transition input vector. Training a classifier may include training a decision tree classifier. Determining the two or more transition guards may further include: determining that the training dataset is not suitable for inferring the two or more transition guards; and in response to determining that the training dataset is not suitable, refining the training dataset. Determining that the training dataset is not suitable for inferring the two or more transition guards may include: determining a risk value relating to a risk of overfitting the training dataset based on a number of transition examples provided in the training dataset; and comparing the risk value to a predetermined risk tolerance. Refining the training dataset may include: determining, based on a plurality of transition examples included in the training dataset, one or more paths relating to the SUT; and executing the one or more paths through a user interface of the SUT to generate additional trace data; and incorporating additional transition examples into the training dataset based on the additional trace data. Determining the one or more paths may include: determining a respective information gain associated with two or more input variables of the transition examples; and ranking the two or more input variables based on the respective information gains; determining one or more path conditions based on unobserved control values of a highest ranked input variable; and applying the path conditions to the behavior model. The behavior model may include a finite state machine (FSM), and the extended behavior model may include an extended finite state machine (EFSM). Receiving a behavior model may include: executing, using a user interface of the SUT, an initial test script on the SUT; recording, after executing the initial test script, a state of the SUT in the behavior model by observing one or more events that can be triggered by the user interface of the SUT; and iteratively refining the behavior model until an end condition is reached by generating one or more new test scripts, executing the new test scripts on the SUT to test unobserved behavior, and recording one or more new states reached by executing the new test scripts of the SUT in the behavior model. Generating one or more new test scripts may include: receiving a document object model (DOM) for the user interface; and for each potential event that can be triggered via the DOM, generating a user interface script that, when executed, triggers the event. The behavior model may be stored in computer-memory as a directed graph. Each of the transition guards may include an expression that must be evaluated as true to permit the respective transitions to occur. Each of the transitions guards may include one or more logical sub-expressions relating to one or more input variables of the respective transitions.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5B depicts an example training dataset.

DETAILED DESCRIPTION

Implementations of the present disclosure are generally directed to a modeling system for determining a behavior model of a computing system under test (SUT). More particularly, implementations of the present disclosure are directed to resolving nondeterminism in a behavior model of a SUT. In some examples, the behavior model can be used for program comprehension and deriving executable test suites using model-based testing (MBT) tools. The modeling system observes the behavior of the SUT through the user interface, e.g., a GUI, of the SUT, and iteratively generates and executes test scripts to explore unobserved behavior. The modeling system determines the behavior model by recording states of the SUT, e.g., where a state relates to a set of events that can be triggered by the user interface of the SUT. In some examples, the behavior model is provided as a finite-state-machine (FSM).

In some instances, the behavior model, e.g., expressed as an FSM, is nondeterministic. A nondeterministic FSM includes at least one source state having multiple transitions with the same initiating event that result in different target states. In some implementations, a nondeterministic behavior model cannot be efficiently used for test case generation, which can be problematic in modeling complex systems with FSMs. Thus, implementations of the present disclosure generate an extended behavior model that describes the observed behavior of a SUT without the problem of nondeterminism. For example, various implementations of the present disclosure infer one or more transition guards for each nondeterministic transition from a source state. The behavior model is extended to include the transition guards to provide an extended behavior model, e.g., provided as an extended FSM (EFSM). From the extended behavior model, executable test suites can be generated that expose changes in the behavior of the application. The resulting extended behavior model can be used for testing the SUT, e.g., regression testing the SUT.

Figure 1:
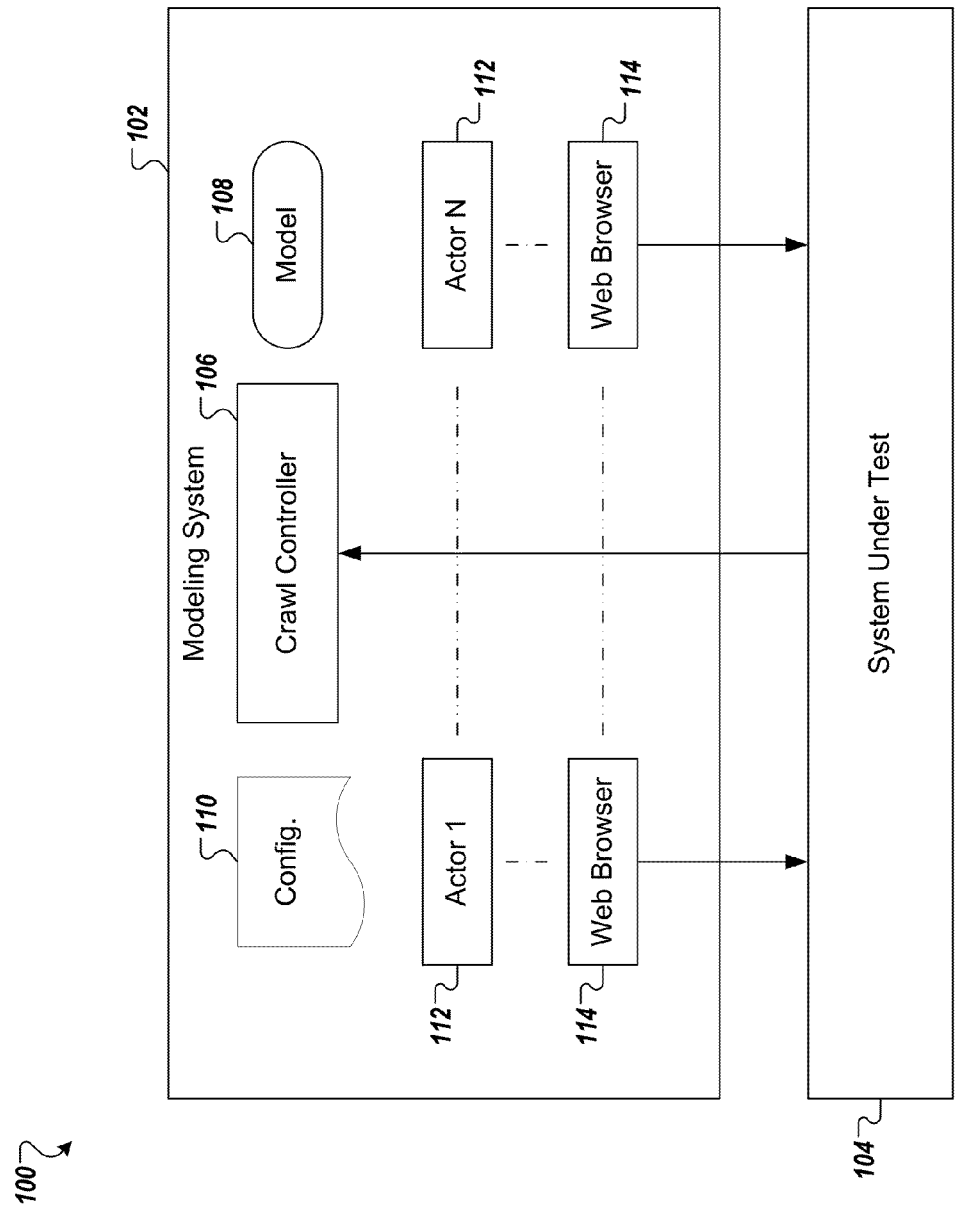
FIG. 1 depicts an example high-level architecture in accordance with implementations of the present disclosure.

FIG. 1 depicts an example architecture 100 in accordance with implementations of the present disclosure. The example architecture 100 includes a modeling system 102 and a SUT 104. In some implementations, the SUT 104 is an enterprise web application executing on a server. The server may be implemented on one or more computing devices remote from the modeling system. In some implementations, the modeling system 102 and the SUT 104 are both applications executing on a system of one or more computing devices. For example, the SUT 104 can execute within a virtual machine executing on the system of one or more computing devices. Implementations of the present disclosure are applicable to any appropriate application or computing environment and are not limited to the examples and implementations discussed herein.

In some implementations, the modeling system 102 includes a crawl controller 106 operable to determine a behavior model 108 for the SUT 104. In this example, the crawl controller 106 executes, using a user interface of the SUT 104, an initial test script (e.g., a start action) on the SUT 104. The crawl controller 106 records, after executing the initial test script, a state of the SUT 104 in the behavior model 108 by, for example, observing one or more events that can be triggered by the user interface of the SUT 104. The crawl controller 106 then iteratively refines the behavior model 108 until an end condition is reached. While iteratively refining the behavior model, the crawl controller 106 generates new test scripts to test unobserved behavior, executes the new test scripts on the SUT, and records new states reached by executing the new test scripts of the SUT 104 in the behavior model 108.

As noted above, in some examples, the SUT 104 is a web application. The crawl controller 106 executes the test scripts by emulating one or more actors 112 using one or more web browsers 114 that communicate with the web application, e.g., over the Internet or another data communications network. The web browsers can be automated using a suitable browser automation framework (e.g., Selenium).

In some examples, configuration information 110, which can be provided by, e.g., a design engineer or test engineer, specifies an exploration scope definition for the modeling system 102. The scope definition specifies the initial test script and information for emulating the actors (virtual users) 112, e.g., login credentials for users of the SUT 104 and a series of steps for each user to take in interacting with the SUT 104. In some examples, the scope definition contains a set of UI views for each actor 112 that shall be explored by the modeling system 102. UI views can be specified by providing a script (e.g., a sequence of UI commands, such as open URL, click link) In some examples, where the SUT 104 is a web application, the configuration information can include a uniform resource locator (URL) for the web application or a URL for each actor 112. The configuration information may also include a test fixture for resetting the web application to a fixed initial state.

In some implementations, the crawl controller 106 is operable to observe the state of the SUT 104. For example, the crawl controller 106 can be operable to determine when a user interacts with the SUT 104, e.g., via a web browser 114, and what changes in the user interface of the SUT 104 follow the user interaction. In some implementations, after one or more of the actors 112 trigger an event in the SUT 104, the crawl controller 106 determines whether the resulting new state of the SUT 104 corresponds to an existing state in the behavior model 108. In some examples, the crawl controller 106 determines whether the new state corresponds to an existing state by comparing potential events that an actor 112 can trigger in the new state using the user interface with each recorded state in the behavior model 108 until a corresponding state is found or all of the recorded states have been compared. In some examples, multiple potential events that can trigger a new state are compared to each recorded state in parallel using hash values.

In some implementations, if the new state does not correspond to an existing state, the crawl controller 106 adds the new state to the behavior model 108 and generates new test scripts for potential events that an actor 112 can trigger in the new state. The crawl controller 106 can then iteratively explore the SUT 104 for unobserved behavior by executing the new test scripts. In some examples, generating a new test script includes receiving a document object model (DOM) for the user interface of the SUT 104, and, for each potential event that an actor 112 can trigger in the DOM, generating a user interface script that, when executed, triggers the event. In some examples, the potential events can be filtered, e.g., by removing deactivated elements and invisible elements from the DOM.

In some implementations, if the new state does correspond to an existing state, then the crawl controller 106 does not add the new state to the behavior model 108. The crawl controller 106 can continue to iteratively explore the SUT 104 for unobserved behavior if there are new test scripts, previously generated, that have not yet been executed, or the crawl controller 106 can reach an end condition indicating that the behavior model 108 is complete.

In some implementations, the crawl controller 106 determines whether an event triggered through the user interface of the SUT 104 is a navigational event or a functional event. If the event is a navigational event, then the crawl controller 106 does not add the resulting new state to the behavior model 108. If the event is a functional event, then the crawl controller 106 does add the new state to the behavior model 108. This can be useful, for example, to avoid capturing volatile specifics of the user interface that are likely to change during the development of the SUT 104.

In some implementations, the SUT 104 is operable to provide functions through different views, e.g., windows in a graphical user interface (GUI), and determining whether a new state corresponds to a navigational event or a functional event includes determining whether the new state corresponds to an event that triggers a different view in the user interface of the SUT 104. Events that trigger different views can be classified as navigational events. In some examples, candidate functional events are identified by extracting, from the user interface of the SUT, a DOM for each of the different views presented and identifying interactive elements, e.g., interactive Hypertext Markup Language (HTML) elements, as candidates for user interface elements that can cause functional events.

Figure 2A:
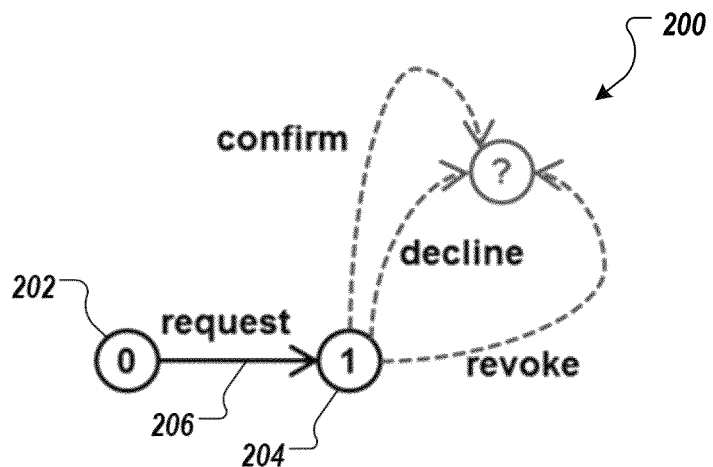
FIGS. 2A and 2B depict example behavior models represented as directed graphs.
Figure 2B:
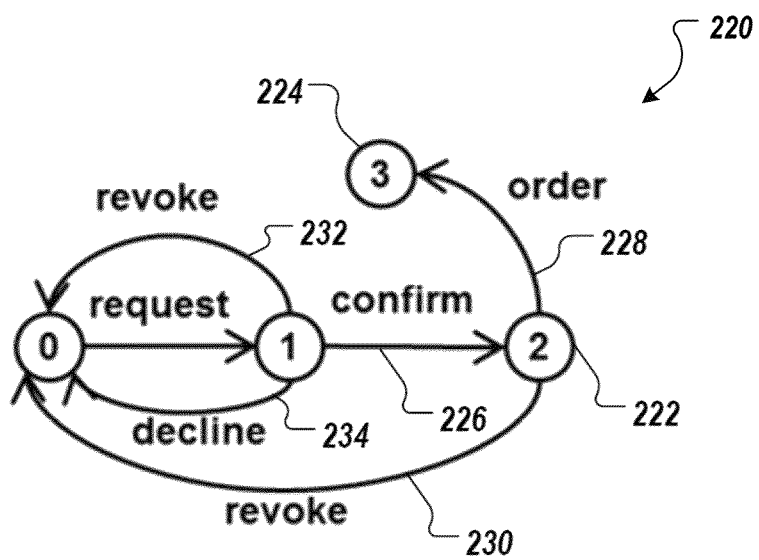

In some implementations, the modeling system 102 stores the behavior model 108 (e.g., an FSM) as a directed graph (e.g., a state map). The directed graph can include a node for each recorded state in the behavior model 108 and edges between nodes. Each edge represents a transition from one state to another. FIGS. 2A and 2B depict example behavior models represented as directed graphs. A modeling system, e.g., the modeling system 102 of FIG. 1, can generate the behavior models of a SUT, e.g. the SUT 104 of FIG. 1.

FIG. 2A depicts an initial behavior model 200 with two nodes 202 and 204 representing two different states of a SUT, labeled "0" and "1." The modeling system begins by observing that the SUT is in state "0" and, by executing an initial test script, triggers a "request" event by the user interface of the SUT to cause the SUT to move to state "1." An edge 206 between the nodes 202 and 204 indicates that, from state "0," triggering the "request" event causes the SUT to move to state "1." In this example, the "request" event initializes the transition from state "0" to state "1."

The modeling system, observing the state of the SUT after the "request" event, determines that there are three potential events that a user can trigger by the user interface, a "confirm" event, a "decline" event, and a "revoke" event. The modeling system can refine the model by generating test scripts to observe the behavior of the system after triggering each of these events.

FIG. 2B depicts a refined behavior model 220 with two additional nodes 222 and 224 representing two new states of the SUT, labeled "2" and "3." The modeling system created this refined model from the initial model by providing and executing test scripts for the potential events of the initial model 200.

One edge 226 indicates that the SUT moved from state "1" to state "2" after triggering the "confirm" event. Another edge 228 indicates that the SUT moved from state "2" to state "3" after triggering an "order" event available in state "2." Another edge 230 indicates that the SUT moved from state "2" to existing state "0" after triggering a "revoke" event. Another edge 232 indicates that the SUT moved from state "1" to existing state "0" after triggering a "revoke" event. Another edge 234 indicates that the SUT moved from state "1" to existing state "0" after triggering a "decline" event.

Figure 3:
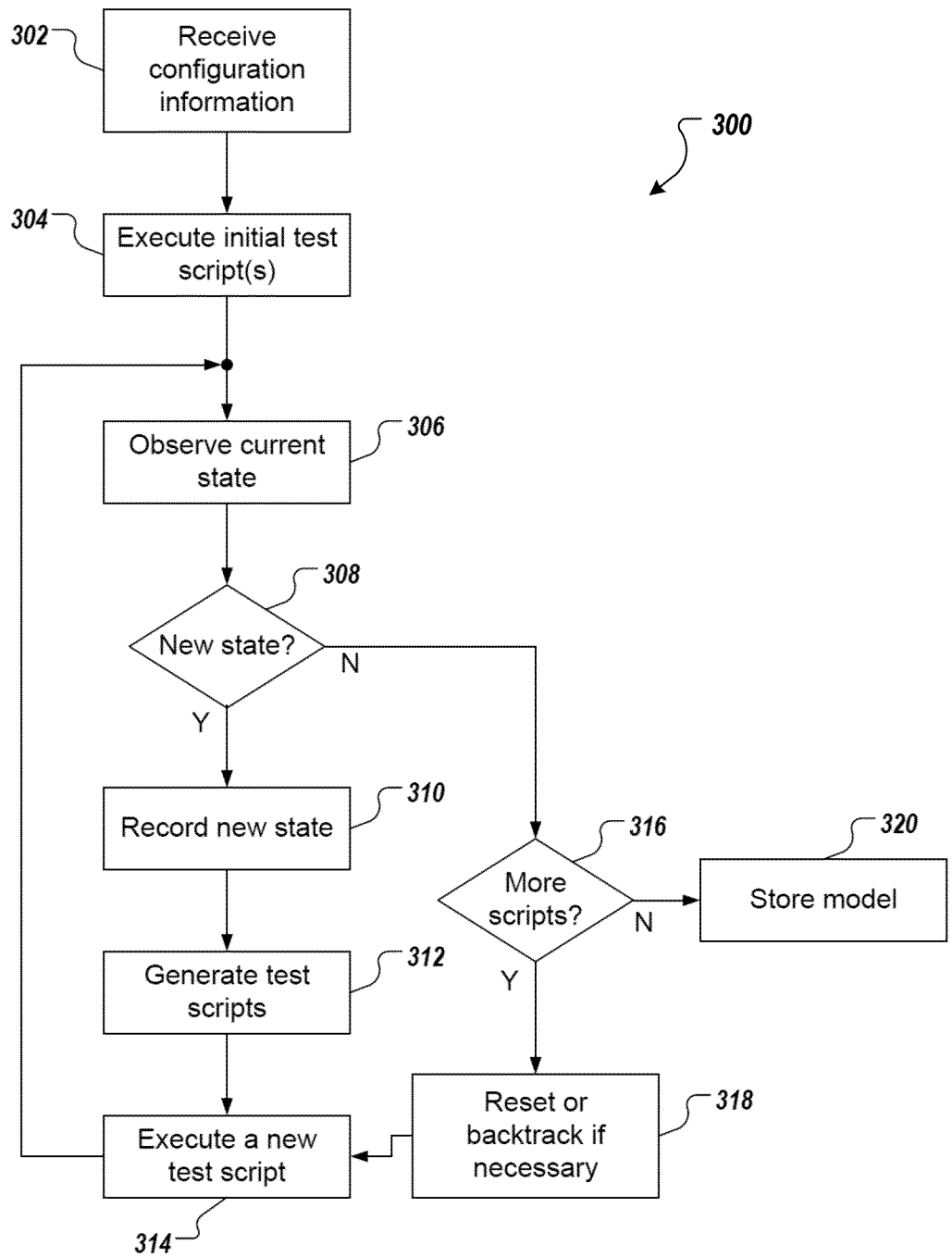
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. For example, the modeling system 102 of FIG. 1 can execute the process in determining a behavior model for a system under test (SUT), e.g., the SUT 104 of FIG. 1.

According to the example process 300, configuration information is received (302). In some examples, the configuration information is provided by a test engineer or a development engineer. The configuration information can include, e.g., an exploration scope definition, one or more user identifiers and login credentials for the user identifiers, initial test scripts for each user identifier, and so on.

The initial test script or scripts are executed (304), and the current state of the SUT is observed (306). It is determined whether the current state is a new state or whether the current state corresponds to an existing state in the model (308). If the state is a new state, the new state is recorded (310), e.g., by adding a node and an edge to a directed graph. New test scripts are generated (312) based on potential events that can be triggered through the user interface of the SUT. One of the new test scripts is selected and executed (314), and then the current state is determined (return to 306).

If the current state corresponds to an existing state, it is determined whether there are more test scripts to execute (316), e.g., by searching the model for unobserved behavior. If there are no more test scripts, the behavior model is stored (320), e.g., as a directed graph. If there are more scripts, then the SUT is reset or backtracked as necessary to reach a state to start one of those scripts, and that script is executed (314).

The process 300 can be implemented in various ways, for example, using Java with Selenium for web browser automation. The following are example routines that can be used in implementing the process.

In some implementations, a process for determining the behavior model is initialized. The process is parameterized with a state s0 in which crawling starts and an initial graph, which is iteratively built up over the set of states. First, the initial state s0 of the SUT is retrieved. A state has a set of potential events which are triggered through the user interface of the SUT in that state; for the initial state s0 the set of potential events is set to the start event defined in the configuration. Furthermore, we maintain a set of pending states Sp which are not completely explored yet, and the set initialized by s0. An empty graph is created and s0 is set as the initial state. The crawling procedure is called with s0 and the graph.

The state of the SUT is retrieved. For each actor, the DOMs of the views defined in the actor configuration are retrieved, removing deactivated and invisible HTML elements. Interactive HTML elements are extracted from the altered DOM df and added to the state's multi-set of events. Two states are considered as equal if and only if the set of distinct elements in the multi-set of events is equal. For each distinct event, a UI script is generated that triggers the event by navigating to the respective view with the respective actor and clicking the HTML element associated with the event.

An iterative crawl procedure is provided for building up the behavior model. In each iteration, the current state of the SUT s0 is checked for pending events. If the set is not empty, an event is removed and the UI script associated with the event is executed. After the script execution, the current state s1 of the SUT is retrieved and the set of pending events, i.e., the events activated by the executed script, is computed as the relative complement of the multi-set of events in s1 with respect to the events in s0. The current state s1 is added to the set of pending states Sp and s1, as well as an edge from s0 to s1, labeled with the triggered event is added to the set of nodes and edges of the graph, respectively. Finally, the crawling procedure is called with s1 and the updated graph. If the set of pending events is empty, s0 is removed from Sp. In case there are still pending states in Sp, a path generation procedure is called to reach a pending state sp and the crawling procedure is called with sp. If the set of pending states is empty, the graph is returned.

In some examples, the path generation procedure computes the shortest path from the current state s0 of the SUT to a pending state sp using Dijkstra's algorithm, and executes the UI scripts to reach sp. If the graph does not contain a path from s0 to a state in Sp, the SUT is set to the initial state by executing the test fixture provided in the configuration, s0 is set to the initial state, and the path generation procedure is called again.

As introduced above, a behavior model, e.g., provided as described above with reference to FIGS. 1-3, can be nondeterministic. For example, the behavior model can include at least one state having multiple outgoing transitions with the same initiating event that result in different target states. Accordingly, and as described in further detail herein, implementations of the present disclosure provide an extended behavior model that resolves nondeterminism to more precisely describe the observed behavior of a SUT. More particularly, implementations of the present disclosure infer one or more transition guards for each nondeterministic transition from a source state to a target state. The behavior model is extended to include the transition guards to provide an extended behavior model, e.g., provided as an extended FSM (EFSM).

Figure 4:
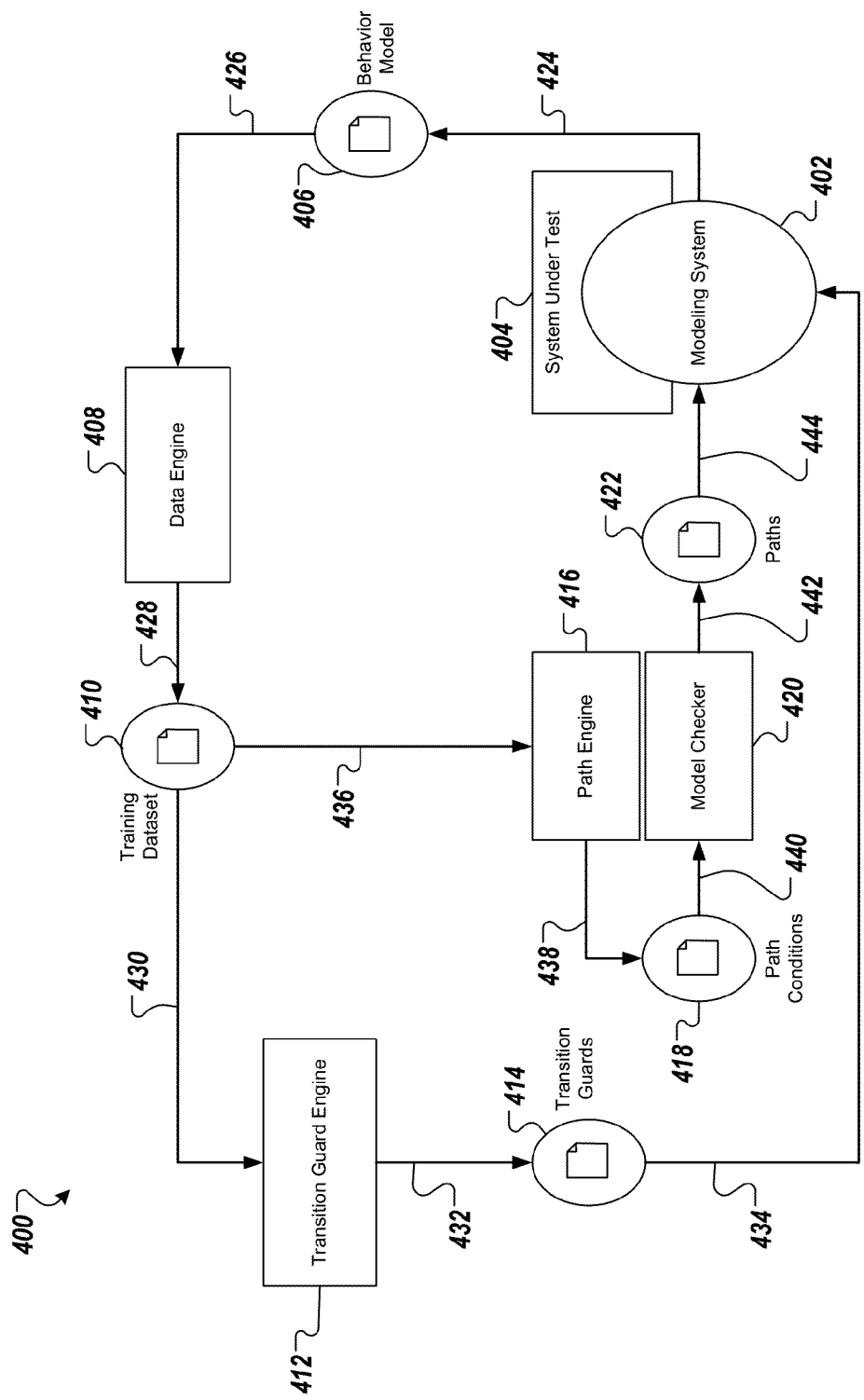
FIG. 4 depicts a schematic diagram of an example process to provide an extended behavior model.

FIG. 4 depicts a schematic diagram of an example protocol 400 for providing an extended behavior model. According to the protocol 400, a modeling system 402 interfaces with a SUT 404 to provide (424) a nondeterministic behavior model 406. For example, the behavior model 406 can be provided as described above with reference to FIGS. 1-3. In some examples, the behavior model 406 is an FSM corresponding to recorded states of the SUT 404. The behavior model 406 is provided (426) to a data engine 408. The data engine 408 produces (428) a training dataset 410 based on the behavior model 406 and the data input information from the modeling system 402. If the training dataset 410 is determined to be suitable for inferring transition guards applicable to nondeterministic transitions in the behavior model 406, it is provided (430) to a transition guard engine 412. The transition guard engine 412 determines (432) transition guards 414 for resolving nondeterministic transitions based on the training dataset 410. The transition guards 414 are provided (434) to the modeling system 402 for producing an extended behavior model, e.g., an EFSM, corresponding to the SUT 404. If the training dataset 410 is determined to not be suitable for inferring the transition guards 414, an iterative refining protocol can be initiated.

According to the iterative refining protocol, the training dataset 410 is provided (436) to a path engine 416. The path engine 416 determines (438) one or more path conditions 418 based on the training dataset 410. The path conditions 418 are provided (440) to a model checker 420. The model checker 420 determines (442) one or more paths 422 based on the path conditions 418. The paths 422 are provided (444) to the modeling system 402. The modeling system 402 interfaces with the SUT 404 to execute the paths 422 to produce data for refining the training dataset 410.

Note that the example protocol 400 is depicted for clarity as involving various discrete components (e.g., the data engine 408, transition guard engine 412, path engine 416 and model checker 420) that are isolated from the modeling system 402. However, one or more of these components may be incorporated within the modeling system 402 without departing from the scope of the present disclosure. Further, it is contemplated within the scope of this disclosure that in various implementations, certain components may be wholly or partially combined, eliminated, rearranged or otherwise altered.

In some implementations, the transition guards 414 are provided as an expression including one or more logical sub-expressions, e.g., Boolean sub-expressions that can be dynamically evaluated based on one or more input variables of a respective transition. In some examples, an input variable of a transition corresponds to a prior event, or a sequence of prior events, that enables the transition. Generally, a transition is enabled only when the one or more logical sub-expressions of the respective transition guard evaluate as true based on the input variables. Thus, with appropriate transition guards in place, transitions between states can be controlled based on the status of one or more input variables. A control value of an input variable represents the state of the variable at a given stage of the SUT.

In some examples, the transition guard engine 412 performs one or more machine learning techniques based on the training dataset 410 to determine the transition guards 414. For example, the transition guard engine 412 can train a classifier using the training dataset 410 and extract the transition guards from the classifier. Suitable machine learning techniques may include algorithms for producing naive Bayes classifiers, support vector machines, decision tree classifiers, k-nearest neighbor classifiers, and Bayesian networks. In some examples, ensemble methods (e.g., bootstrapping, boosting) can be used to combine multiple classifiers.

In some implementations, the training dataset 410 includes a plurality of transition examples based on trace data from observing the nondeterministic transitions. In some examples, trace data is generated and stored in computer-readable memory as the modeling system 402 interfaces with the SUT 404 to produce the behavior model 406, e.g., as a crawl controller of the modeling system 402 iteratively explores the SUT 404. Each transition example may include a transition input vector associated with a respective transition outcome. In some examples, each transition input vector includes respective control values for a set of input variables of the transitions. In some examples, the transition outcome includes a target state of the transition in accordance with the transition input vector. In some examples, the data engine 408 produces the training dataset 410 by aggregating transition input vectors in the trace data that are associated with the most recent control value observed for each input variable.

In some implementations, determining whether the training dataset 410 is suitable for inferring the transition guards 414 includes determining whether the risk of overfitting the training data is beyond an acceptable risk tolerance. In some examples, overfitting occurs when a classifier, which is trained according to a machine learning algorithm, describes noise in the training dataset 410 instead of the relationship between the transition examples. Thus, the overfit classifier may perform well on the training data but poor on unseen samples. In some examples, determining whether the risk of overfitting is beyond the risk tolerance includes comparing the number of transition examples in the training dataset 410 to a predetermined threshold value. In some examples, determining whether the risk of overfitting is beyond the risk tolerance includes determining a ratio relating the number of transition examples with the number of input variables in each transition input vector of the training dataset 410; and comparing the ratio to a predetermined threshold value.

In some implementations, the path conditions 418 determined by the path engine 416 are based on unobserved control values for one or more input variables in the training dataset 410. In some examples, the path engine 416 determines the path conditions 418 by selecting informative input variables and designating unobserved control values of the informative input variables as the path conditions 418. In some examples, the input variables are selected based on an expected information gain. The information gain for an input variable corresponds to its reduction in information entropy, e.g., uncertainty or unpredictability, of the transition input vector. An input variable with high information gain (high information entropy) may be considered relatively informative. On the other hand, an input variable with low information gain (low information entropy) may be considered relatively uninformative. In some examples, the path engine 416 ranks the input variables of the training dataset 410 based on information gain and selects one or more of the most informative input variables for determining the path conditions 418.

In some implementations, paths 422 determined by the model checker 420 refer to one or more transitions between states of the behavior model 406. In some examples, the model checker 420 determines the one or more paths 422 by applying the path conditions 418 to the behavior model 406. That is, the model checker 420 can identify one or more paths 422 in the behavior model 406 that satisfy the path conditions 418. In some implementations, the modeling system 402 interfaces with the SUT 404 by executing the paths 422 determined by the model checker 420. Additional trace data is generated and stored in computer-readable memory as the modeling system 402 explores the paths 422 in the SUT 404. In some examples, the data engine 408 incorporates the additional trace data into the training dataset 410. In some implementations, the data engine 408 determines whether the refined training dataset 410 is suitable for inferring the transitions guards 414. If the refined training dataset 410 is not determined to be suitable for inferring the transition guards 414, the iterative protocol can be repeated with respect to one or more of the next most informative input variables.

In some examples, the following pseudo-code provides an algorithm for providing an extended behavior model for an application (ABM).

---
Algorithm INFERGUARDS

Data: ABM, transition $t_1$
Output: ABM with transition guards
1 $\{t_1, ..., t_n\}$ ← ABM.GETNONDETTRANSITIONS($t_1$);
2 T : $\{(v_1, s_1), ..., (v_n, s_n)\}$ ← TRAININGSET($t_1, ..., t_n$);
3 A ← RANKATTRIBUTES($\{(v_1, s_1), ..., (v_n, s_n)\}$);
4 foreach $a_i \in A$ do
5 $\quad$ | $(v_i, s_i)$ ← EXPLOREPATHS(ABM, $a_i$);
6 $\quad$ | T ← T ∪ $(v_i, s_i)$;
7 end
8 C ← BUILDCLASSIFIER(T);
9 $\{(t_1, g_1), ..., (t_n, g_n)\}$ ← EXTRACTGUARDS(C);
10 ABM ← ADDGUARDS(ABM, $\{(t_1, g_1), ..., (t_n, g_n)\}$);
11 return ABM;

---

First, a first set of nondeterministic transitions $\{t_1, \ldots, t_n\}$ in the ABM is identified (Line 1). The set of nondeterministic transitions includes the transition $t_1$ and n other transitions with the same source state and initiating event, but that result in different target states. A training dataset T: $\{(v_1,s_1), \ldots, (v_n,s_n)\}$ is constructed from the trace data of the nondeterministic transitions (Line 2). The training dataset T includes a transition input vector $v_i$ including one or more input variables with variable control value assignments extracted from the trace data, and a resulting target state $s_i$ associated with the transition input vector. The input variables of the transition input vector $v_i$ are ranked based on their information gain (Line 3). For each input variable $a_i$ of the set of ranked input variables A, additional paths through the application are determined and executed based on unobserved control values of the input variable (Lines 4-5). Trace data from executing the additional paths is added to the training dataset T (Line 6). In some examples, the iterative loop for refining the training dataset is terminated (Line 7) when the training dataset T is determined to be sufficient for inferring transition guards applicable to nondeterministic transitions $\{t_i, \ldots, t_n\}$. A suitable machine learning algorithm is used to train a classifier C based on the training dataset (Line 8). A set of transition guards $\{(t_1,g_1), \ldots, (t_n,g_n)\}$ relating to the set of nondeterministic transitions $\{t_1, \ldots, t_n\}$ is determined using the classifier C (Line 9). The transition guards are incorporated into the ABM to provide an extended ABM (Lines 10-11).

Figure 5A:
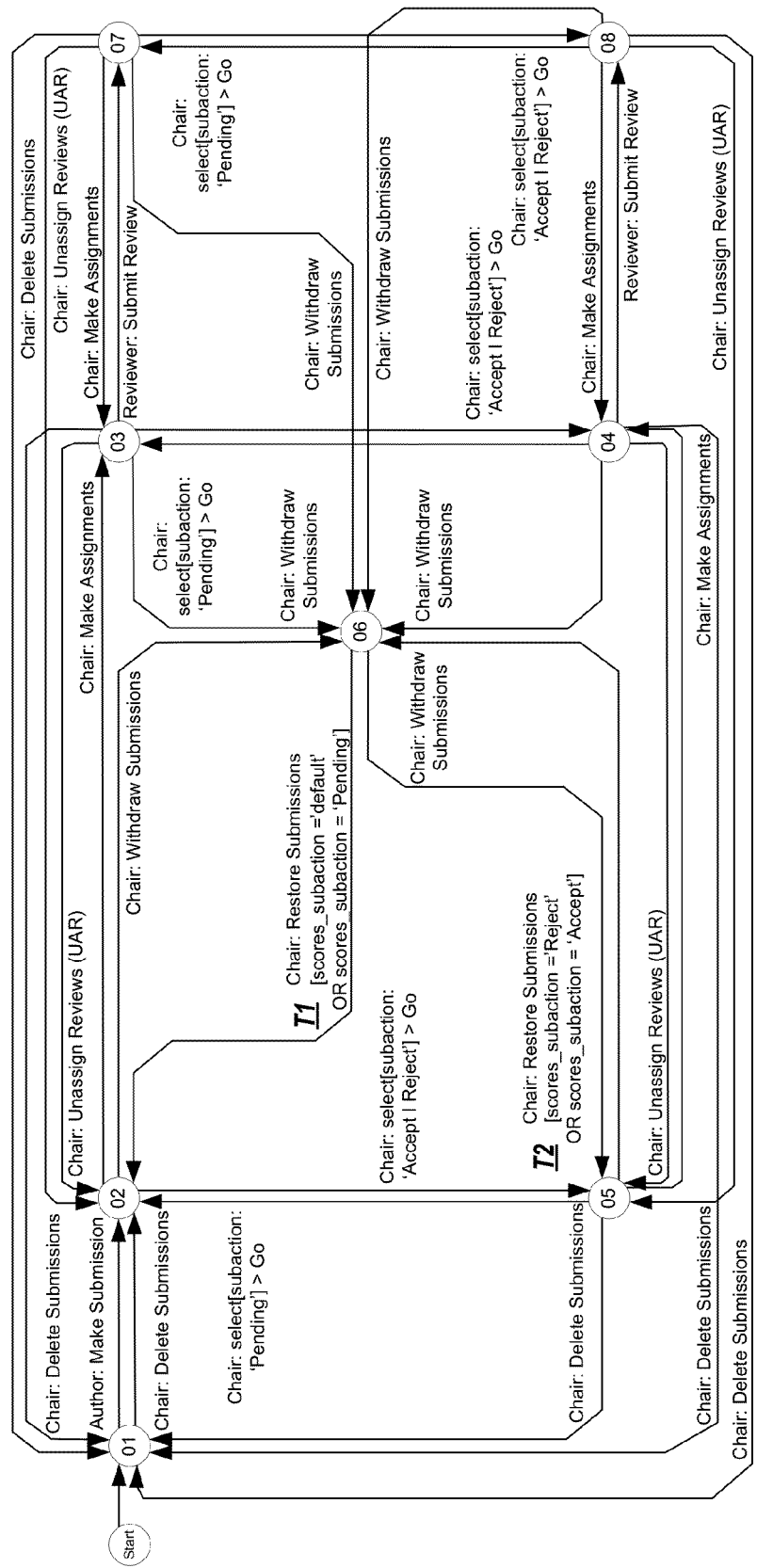
FIG. 5A depicts an example extended behavior model.

FIG. 5A depicts a portion of an example extended behavior model 500. In this example, the behavior model 500 relates to the life-cycle of a document in a peer-review system. Using a user interface of the system, "authors" can submit documents which are then reviewed by peer "reviewers" to be accepted or rejected. A "chair" interfaces with system through the user interface to manage the peer-review process. In some implementations, a modeling system (e.g., the modeling systems 102 and 402) can access the peer-review system using a login script for an author, a reviewer and the chair to produce the extended behavior model 500.

According to the extended behavior model 500, after the author makes a submission, the state of the submitted document is pending (Transition from State 01 to State 02). The chair can take action through the user interface to accept or reject the document (Transition from State 02 to State 05) before assigning a reviewer. From each of the two unassigned states (State 02 and State 05), there is a first transition to a corresponding state initialized by the assignment of a reviewer to the document by the chair (State 03 and State 04), and a second transition to a corresponding state initialized by the submission of a review of the document by the assigned reviewer (State 07 and 08). At any state, the chair can revoke an earlier event, assign a new reviewer, or withdraw the document entirely (Transitions from States 02, 03, 05, 04, 07 and 08 to State 06). From the withdrawn state (State 06), the chair can restore a withdrawn document to a previous status of pending (Transition from State 06 to State 02), which is the default, or accepted/rejected (Transition from State 06 to State 05).

In this example, the transitions from the withdrawn state (Transitions from State 06 to State 02 or State 05) are nondeterministic transitions because they share a common source state (State 06) and a common initiating event (a restore event by the chair). Mutually exclusive guard conditions T1 and T2 are provided by a trained classifier (e.g., a decision tree classifier) to resolve the nondeterminism in the transitions from the withdrawn state (State 06). In this example, the guard conditions T1 and T2 relate to a specific input variable (scores_subaction) that controls the transition path. The control value of the input variable can be set by the chair through the user interface of the system. Under the guard-condition T1, the transition from State 06 to State 02 can only be initiated in response to a restore event if one of the following T1 sub-expressions are resolved as true: scores_subaction='default' or scores_subaction='Pending'. Under the guard condition T2, the transition from State 06 to State 05 can only be initiated by the restore event if one of the following T2 sub-expressions are resolved as true: scores_subaction='Reject' or scores_subaction='Accept'.

FIG. 5B depicts an example training dataset 510 used to train the classifier from which the guard-condition sets T1 and T2 were extracted. In this example, the training dataset 510 includes four transition examples 550 based on trace data observed from the modeling system interfacing with the peer-review system. Each of the transition examples includes a transition input vector 552 and a corresponding transition outcome 554 (a target state). The transition input vectors 552 include respective control values for a set of input variables. In this example, the input variables include: scores_boxselect, subs_subaction, scores_asubmit, and scores_subaction.

In some implementations, at least one of the transition examples 550 could be added to the training dataset 510 using the above-described iterative refining approach based on an expected information gain of each input variable. In this example, the scores_subaction input variable is attributed with the highest information gain (an information gain of 1.0). Thus, any additional transition examples could be provided based on paths intended to generate new control values for the scores_subaction input variable. For example, assume that the training dataset 510 originally incorporated only the first three transition examples 550—the examples including the "Reject," Accept," and "default" control values for the scores_subaction input variable. In this example, the last transition example 550 including the "Pending" control value for the scores_subaction input variable could be added using the iterative refining approach. As noted above, the refining approach can be repeated iteratively using the input variable with the next highest information gain.

Figure 6:
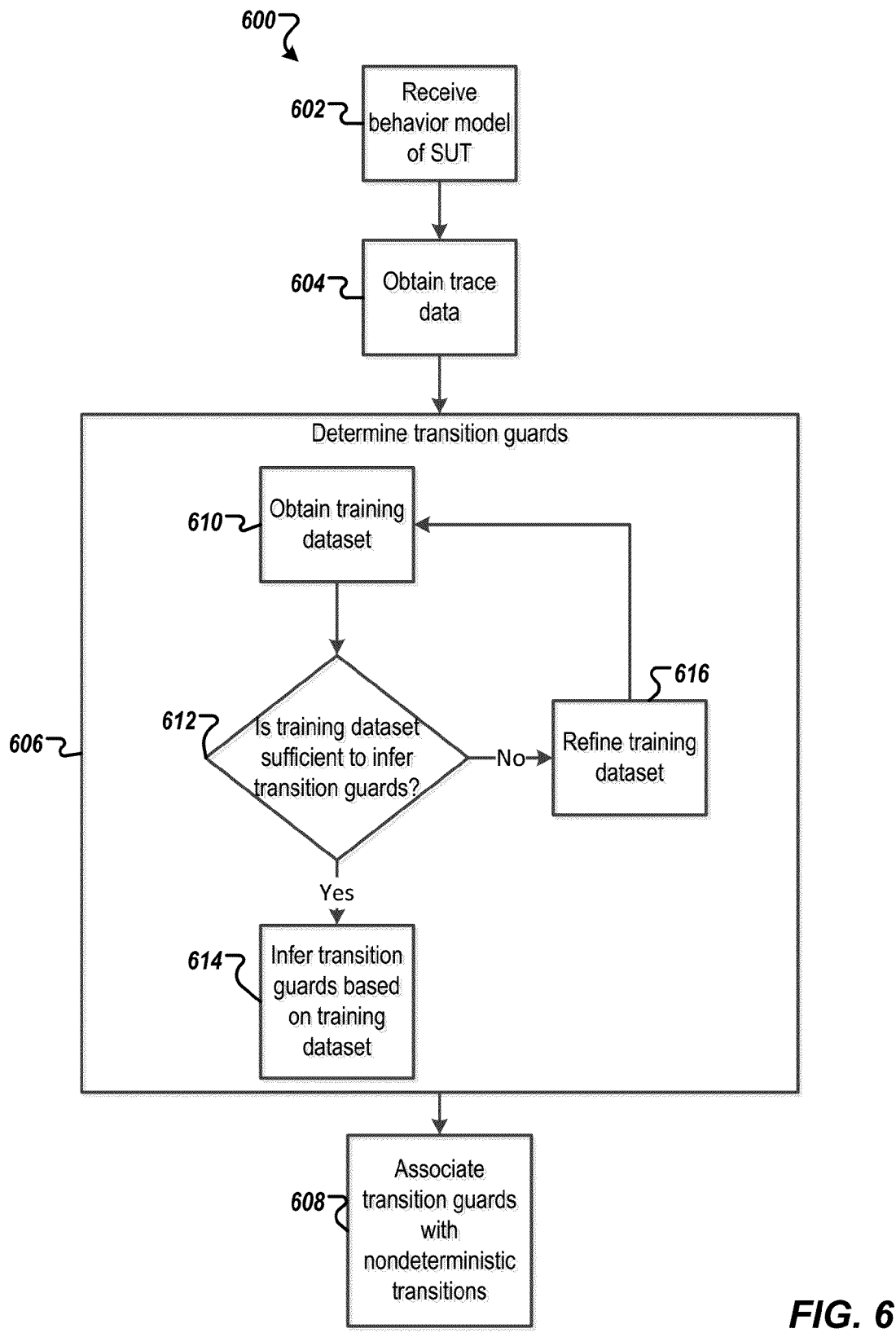
FIG. 6 depicts an example process that can be executed in accordance with implementations of the present disclosure.

FIG. 6 depicts an example process 600 that can be executed in accordance with implementations of the present disclosure. In some examples, the example process 600 can be provided as one or more computer-executable programs executed using one or more computing devices. For example, the components of FIG. 4 can execute the process in determining an extended behavior model for a system under test (SUT), e.g., the SUT 104 of FIG. 4.

According to the example process 600, a behavior model relating to the SUT is received (602). The behavior model includes two or more nondeterministic transitions that share a common source state and a common initiating event, but result in different target states. In some examples, the behavior model is an FSM stored in computer memory as a directed graph. In some examples, the SUT is a web application accessible to a user via a user interface executing on a web browser. Trace data associated with execution of the SUT across the two or more nondeterministic transitions is obtained (604). In some examples, the trace data is generated as a modeling system (e.g., the modeling systems 102 and 402) interface with the SUT to provide the behavior model. Two or more transition guards are determined (606) based on the trace data. In some examples, the two or more transition guards include mutually exclusive conditions that resolve the nondeterminism of the two or more nondeterministic transitions. The two or more transition guards are associated (608) with the two or more nondeterministic transitions to provide an extended behavior model. In some examples, the extended behavior model is used to derive a test suite (e.g., a browser automation test suite) executable on the SUT.

In some implementations, determining (606) the two or more transition guards includes obtaining (610) a training dataset and, if the training dataset is to be sufficient (612), inferring (614) the transition guards based on the training dataset. In some examples, the training dataset includes a plurality of transition examples. Each of the transition examples can include a transition input vector and a transition outcome. In some examples, the transition input vector can include respective control values for a set of input variables, and the transition outcome includes a target state of a transition based on the control values. In some implementations, if the training dataset is not determined to be sufficient (612) for inferring the transition guards, the training dataset can be refined (616). In some examples, refining the training dataset includes an iterative process of including—ranking the input variables within the training dataset according to information gain; determining one or more paths relating to the SUT based on a highest ranked input variable; and executing the one or more paths in the SUT to generate additional training examples for the training dataset. In some implementations, inferring (614) the two or more transition guards includes training a classifier (e.g., a decision tree classifier) by applying a machine learning algorithm to the training dataset and extracting the transition guards from the trained classifier.

Figure 7:
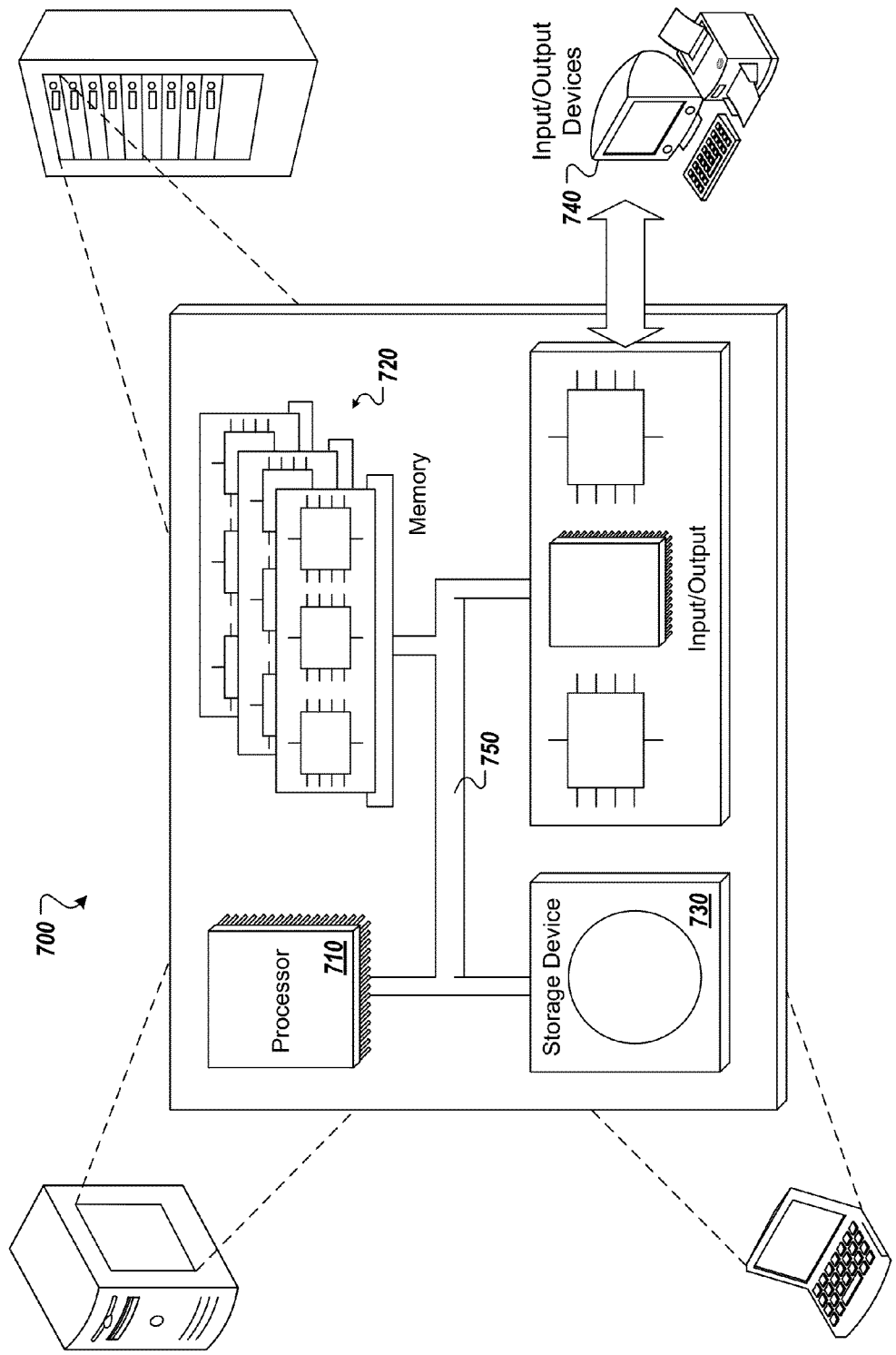
FIG. 7 is a schematic illustration of example computer systems that can be used to execute implementations of the present disclosure.

Referring now to FIG. 7, a schematic diagram of an example computing system 700 is provided. The system 700 can be used for the operations described in association with the implementations described herein. For example, the system 700 may be included in any or all of the server components discussed herein. The system 700 includes a processor 710, a memory 720, a storage device 730, and an input/output device 740. The components 710, 720, 730, 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 800. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for resolving nondeterminism in a behavior model of a computing system under test (SUT), the method being executed using one or more processors and comprising:
   receiving, by the one or more processors, a behavior model relating to a SUT, the behavior model comprising two or more nondeterministic transitions;
   obtaining, by the one or more processors, trace data associated with execution of the SUT across the two or more nondeterministic transitions;
   determining, by the one or more processors, based on the trace data, two or more transition guards that resolve nondeterminism of the two or more nondeterministic transitions, wherein determining the two or more transition guards comprises:
      providing a training dataset based on the trace data;
      training a classifier based on the training dataset via a machine learning algorithm; and
      inferring the two or more transition guards based on output from the classifier; and
   associating, by the one or more processors, the two or more transition guards with the two or more nondeterministic transitions to provide an extended behavior model.

2. The method of claim 1, further comprising:
   deriving, via a model-based test generator, a test suite based on the extended behavior model; and
   executing the test suite on the SUT.

3. The method of claim 2, wherein the SUT is an enterprise web application, and wherein executing the test suite comprises automating a web browser.

4. The method of claim 1, wherein the training dataset comprises a plurality of transition examples, each transition example comprising
   a transition input vector comprising respective control values for a set of input variables; and
   a transition outcome comprising a target state in accordance with the control values of the transition input vector.

5. The method of claim 1, training a classifier comprises training a decision tree classifier.

6. The method of claim 1, wherein determining the two or more transition guards further comprises:
   determining that the training dataset is not suitable for inferring the two or more transition guards; and
   in response to determining that the training dataset is not suitable, refining the training dataset.

7. The method of claim 6, wherein determining that the training dataset is not suitable for inferring the two or more transition guards comprises:
  determining a risk value relating to a risk of overfitting the training dataset based on a number of transition examples provided in the training dataset; and
  comparing the risk value to a predetermined risk tolerance.

8. The method of claim 7, wherein refining the training dataset comprises:
  determining, based on a plurality of transition examples included in the training dataset, one or more paths relating to the SUT; and
  executing the one or more paths through a user interface of the SUT to generate additional trace data; and
  incorporating additional transition examples into the training dataset based on the additional trace data.

9. The method of claim 8, wherein determining the one or more paths comprises:
  determining a respective information gain associated with two or more input variables of the transition examples; and
  ranking the two or more input variables based on the respective information gains;
  determining one or more path conditions based on unobserved control values of a highest ranked input variable; and
  applying the path conditions to the behavior model.

10. The method of claim 1, wherein the behavior model comprises a finite state machine (FSM), and wherein the extended behavior model comprises an extended finite state machine (EFSM).

11. The method of claim 1, wherein receiving a behavior model comprises:
  executing, using a user interface of the SUT, an initial test script on the SUT;
  recording, after executing the initial test script, a state of the SUT in the behavior model by observing one or more events that can be triggered by the user interface of the SUT; and
  iteratively refining the behavior model until an end condition is reached by generating one or more new test scripts, executing the new test scripts on the SUT to test unobserved behavior, and recording one or more new states reached by executing the new test scripts of the SUT in the behavior model.

12. The method of claim 11, wherein generating one or more new test scripts comprises:
  receiving a document object model (DOM) for the user interface; and
  for each potential event that can be triggered via the DOM, generating a user interface script that, when executed, triggers the event.

13. The method of claim 1, wherein the behavior model is stored in computer-memory as a directed graph.

14. The method of claim 1, wherein each of the transition guards comprises an expression that must be evaluated as true to permit the respective transitions to occur.

15. The method of claim 14, wherein each of the transitions guards includes one or more logical sub-expressions relating to one or more input variables of the respective transitions.

16. A non-transitory computer-readable storage medium coupled to one or more processors and having instructions stored thereon which, when executed by the one or more processors, cause the one or more processors to perform operations for resolving nondeterminism in a behavior model of a computing system under test (SUT), the operations comprising:
  receiving, by the one or more processors, a behavior model relating to a SUT, the behavior model comprising two or more nondeterministic transitions;
  obtaining, by the one or more processors, trace data associated with execution of the SUT across the two or more nondeterministic transitions;
  determining, by the one or more processors, based on the trace data, two or more transition guards that resolve nondeterminism of the two or more nondeterministic transitions, wherein determining the two or more transition guards comprises:
    providing a training dataset based on the trace data;
    training a classifier based on the training dataset via a machine learning algorithm; and
    inferring the two or more transition guards based on output from the classifier; and
  associating, by the one or more processors, the two or more transition guards with the two or more nondeterministic transitions to provide an extended behavior model.

17. A system, comprising:
  a computing device including one or more processors; and
  a computer-readable storage device coupled to the computing device and having instructions stored thereon which, when executed by the computing device, cause the computing device to perform operations for resolving nondeterminism in a behavior model of a computing system under test (SUT), the operations comprising:
    receiving, by the one or more processors, a behavior model relating to a SUT, the behavior model comprising two or more nondeterministic transitions;
    obtaining, by the one or more processors, trace data associated with execution of the SUT across the two or more nondeterministic transitions;
    determining, by the one or more processors, based on the trace data, two or more transition guards that resolve nondeterminism of the two or more nondeterministic transitions, wherein determining the two or more transition guards comprises:
      providing a training dataset based on the trace data;
      training a classifier based on the training dataset via a machine learning algorithm; and
      inferring the two or more transition guards based on output from the classifier; and
    associating, by the one or more processors, the two or more transition guards with the two or more nondeterministic transitions to provide an extended behavior model.

* * * * *